United States Patent
Dorward

(10) Patent No.: US 7,555,213 B2
(45) Date of Patent: Jun. 30, 2009

(54) PREVENTING DAMAGE TO OPTICAL COMPONENTS FROM OPTICAL TIME DOMAIN REFLECTOMETERS

(75) Inventor: Richard Munro Dorward, Coventry (GB)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 10/550,418

(22) PCT Filed: Mar. 12, 2004

(86) PCT No.: PCT/GB2004/001057

§ 371 (c)(1),
(2), (4) Date: Sep. 20, 2005

(87) PCT Pub. No.: WO2004/084439

PCT Pub. Date: Sep. 30, 2004

(65) Prior Publication Data

US 2006/0182405 A1     Aug. 17, 2006

(30) Foreign Application Priority Data

Mar. 21, 2003 (GB) .................................. 0306482.1

(51) Int. Cl.
    *H04B 10/00* (2006.01)
(52) U.S. Cl. .............................. 398/21; 398/18; 398/10; 398/11
(58) Field of Classification Search .................. 398/13, 398/20, 21, 10, 11, 18
See application file for complete search history.

(56) References Cited

U.S. PATENT DOCUMENTS 5,214,728 A * 5/1993 Shigematsu et al. ............ 385/24
5,453,827 A   9/1995 Lee
5,790,285 A * 8/1998 Mock ........................... 398/21
6,519,026 B1  2/2003 Holland
6,577,385 B1* 6/2003 Sakamoto et al. .......... 356/73.1
2004/0004709 A1* 1/2004 Pitchforth, Jr. ............. 356/73.1

FOREIGN PATENT DOCUMENTS

JP        5-103583       4/1993

* cited by examiner

*Primary Examiner*—Agustin Bello
(74) *Attorney, Agent, or Firm*—Kirschstein, et al.

(57) ABSTRACT

There is provided in a telecommunications network comprising an optical fiber cable, and an optical component connected to a first point of the optical fiber cable, with an optical time domain reflectometer (OTDR) connected to a second point of the optical fiber cable so that it can emit OTDR signals along the optical fiber cable towards the optical component, a method of preventing OTDR signals from being applied to the optical component, comprising introducing one or more optical signals into the optical fiber cable at the first point thereof using the optical fiber cable to carry the optical signals to the second point thereof, and configuring the OTDR to detect the or each optical signal from the optical fiber cable and to prevent emission of OTDR signals at any time during which detection of an optical signal occurs. The optical component may comprise, for example, an optical receiver which may introduce the optical signals into the optical fiber cable. Alternatively, introducing one or more optical signals into the optical fiber cable may comprise superimposing one or more optical signals onto the optical fiber cable. The OTDR may comprise a detector, used to detect the or each optical signal from the optical fiber cable. The OTDR may comprise a transmitter, used to emit OTDR signals, and disabled to prevent emission of OTDR signals at any time during which detection of an optical signal occurs.

14 Claims, 1 Drawing Sheet

PREVENTING DAMAGE TO OPTICAL COMPONENTS FROM OPTICAL TIME DOMAIN REFLECTOMETERS

Figure 1:
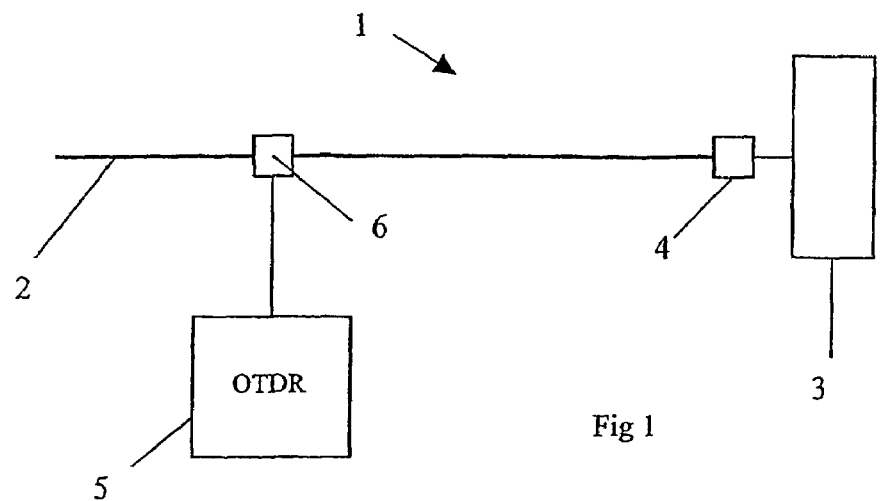

This invention relates to preventing damage to optical components from optical time domain reflectometers (OTDRs), particularly when these are used to test optical fibre cables to which optical components are connected.

OTDRs are commonly used to test optical fibre cables, to identify whether there are any imperfections in a cable, particularly a break, and where any imperfections have occurred. OTDRs generally comprise a transmitter which emits OTDR signals into a cable, and a receiver which looks for echoes of the OTDR signals reflected from any imperfections in the cable. For example, to look for a suspected break in a cable, an OTDR is inserted into the cable at a convenient junction thereof. The break may lie on either side of the junction. OTDR signals are therefore emitted into the cable in a first direction from the junction, and then in a second, opposite direction from the junction, and in each case echoes of the OTDR signals looked for. Such echoes will be received from the cable on one side of the junction, and this will indicate where the break in the cable has occurred.

A problem can arise when looking for a break in a cable, if an OTDR is used near the end of the cable, to which an optical component is connected. If the break does not lie between the OTDR and the end of the cable, then the OTDR signals emitted by the OTDR will be applied to the optical component. The OTDR signals are in the form of a series of short, high power pulses, and the peak power of the pulses can typically be around 20 dBm. Depending on the nature of the component, receipt of such OTDR signals can result in damage to the component. For example, the optical component may comprise an optical receiver. Such receivers are designed to be highly sensitive to optical signals, and generally do not tolerate high power levels without damage. It is therefore desirable to prevent such optical components from receiving OTDR signals from an OTDR.

According to the invention there is provided in a telecommunications network comprising an optical fibre cable, and an optical component connected to a first point of the optical fibre cable, with an optical time domain reflectometer (OTDR) connected to a second point of the optical fibre cable so that it can emit OTDR signals along the optical fibre cable towards the optical component, a method of preventing OTDR signals from being applied to the optical component, comprising introducing one or more optical signals into the optical fibre cable at the first point thereof, using the optical fibre cable to carry the optical signals to the second point thereof, and configuring the OTDR to detect the or each optical signal from the optical fibre cable and to prevent emission of ODTR signals at any time during which detection of an optical signal occurs.

When there is no break in the optical fibre cable between the first point and the second point, optical signals will be received by the OTDR. This prevents emission of OTDR signals, so no such signals will be applied to the optical component and damage thereto is avoided. When there is a break in the optical fibre cable between the first point and the second point, no optical signals will be received by the OTDR. This will then emit OTDR signals, and echoes of the OTDR signals will be reflected back from the break, and its presence and position can be confirmed/determined. As there is a break in the cable, the OTDR signals do not reach the optical component, and no damage is caused to it. The method therefore provides a system for preventing damage to optical components from OTDRs, when these are used to test for breaks in optical fibre cables.

The optical component may comprise an optical receiver, and introducing one or more optical signals into the optical fibre cable at the first point thereof may comprise arranging the optical receiver to introduce one or more optical signals into the optical fibre cable. This may be achieved by, for example, providing the optical receiver with a transmitting device, and transmitting one or more optical signals from the transmitting device into the optical fibre cable. The or each optical signal may be carried along the optical fibre cable in a direction opposite to that of traffic signals which would normally be transmitted along the optical fibre cable and received by the optical receiver. The optical receiver may comprise an avalanche photodiode or a PIN diode.

The optical component may comprise a receive erbium doped fibre amplifier (EDFA), and introducing one or more optical signals into the optical fibre cable at the first point thereof may comprise arranging the receive EDFA to introduce one or more optical signals into the optical fibre cable. This may be achieved by, for example, controlling the isolation of an input isolator of the receive EDFA such that, in the absence of an input signal thereto, one or more optical signals in the form of ASE noise escapes from the input of the receive EDFA and is introduced into the optical fibre cable. The or each optical signal may be carried along the optical fibre cable in a direction opposite to that of traffic signals which would normally be transmitted along the optical fibre cable and received by the receive EDFA. The receive EDFA may be provided as part of an optical receiver. Preventing OTDR signals from being applied to the receive EDFA will prevent such signals being applied to the optical receiver, and damage to the optical receiver is thereby avoided.

Introducing one or more optical signals into the optical fibre cable at the first point thereof may comprise superimposing one or more optical signals onto the optical fibre cable. This may be achieved by multiplexing one or more optical signals onto the optical fibre cable, for example using a wavelength division multiplexor (WDM) or a tap coupler. The or each optical signal may be carried along the optical fibre cable in a direction opposite to or the same as that of traffic signals which would normally be transmitted along the optical fibre cable. The or each optical signal may comprise a pilot signal. The or each pilot signal may be a continuous signal or a modulated signal. The or each pilot signal may have a wavelength different to that of traffic signals which would normally be transmitted along the optical fibre cable, e.g. 1310 nm or 1510 nm.

Introducing one or more optical signals into the optical fibre cable at the first point thereof may comprise superimposing one or more optical service channel (OSC) optical signals onto the optical fibre cable. This may be achieved by multiplexing one or more OSC optical signals onto the optical fibre cable, for example using a WDM or a tap coupler. The or each OSC optical signal may be carried along the optical fibre cable in a direction opposite to or the same as that of traffic signals which would normally be transmitted along the optical fibre cable. The or each OSC optical signal may have a wavelength of approximately 1510 nm.

The OTDR may comprise a transmitter. The OTDR transmitter may be used to emit OTDR signals, for example along an optical fibre cable. The OTDR transmitter may be disabled to prevent emission of ODTR signals at any time during which detection of an optical signal occurs. The OTDR may comprise a detector. The OTDR detector may be used to detect the or each optical signal from the optical fibre cable.

The OTDR detector may be able to detect optical signals in a wavelength range of approximately 1250 nm to approximately 1700 nm. The OTDR detector may be used to receive echoes of OTDR signals, for example reflected from any imperfections in an optical fibre cable. Alternatively, the OTDR may comprise a receiver. The OTDR receiver may be used to receive echoes of OTDR signals, for example reflected from any imperfections in an optical fibre cable.

Figure 2:
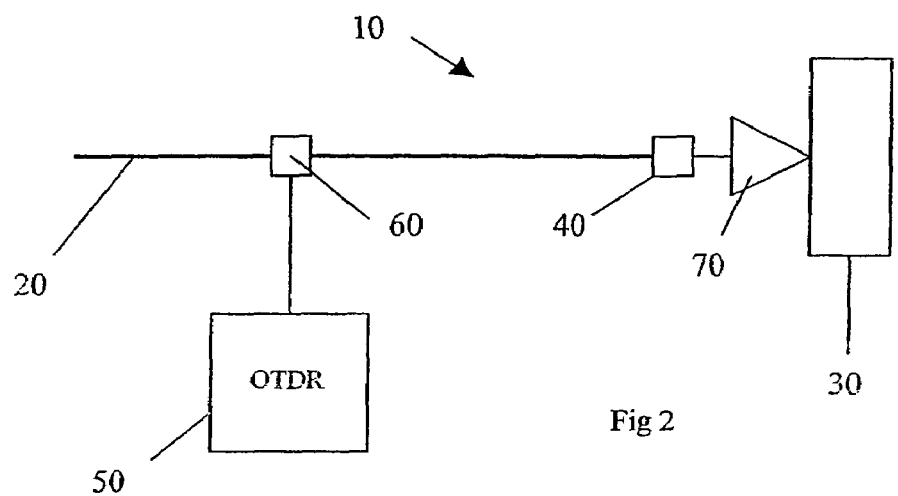
Figure 3:
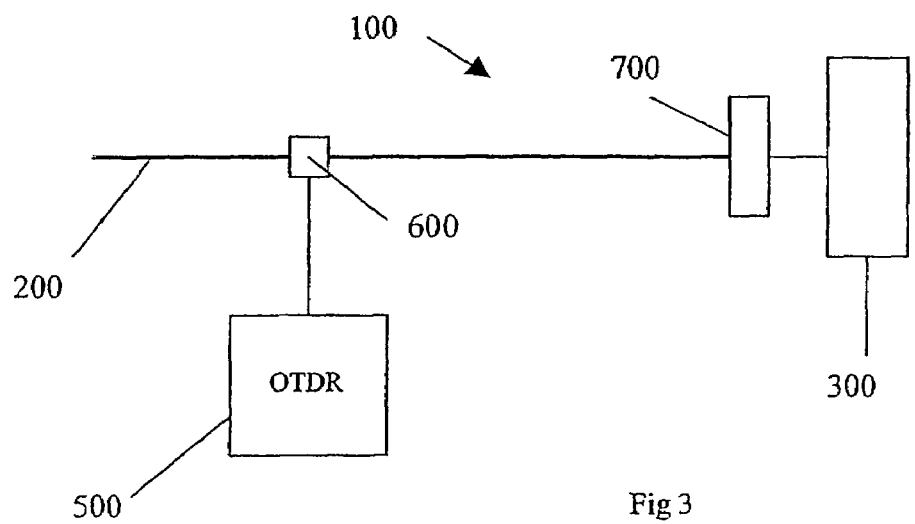

Embodiments of the invention will now be described, by way of example only, with reference to the accompanying drawings, in which:

FIG. 1 is a schematic representation of a first embodiment of a telecommunications network in which the method of the invention is used, FIG. 2 is a schematic representation of a second embodiment of a telecommunications network in which the method of the invention is used, and FIG. 3 is a schematic representation of a third embodiment of a telecommunications network in which the method of the invention is used.

FIG. 1 shows a telecommunications network 1, comprising an optical fibre cable 2, an optical component 3 connected to a first point 4 of the optical fibre cable 2, and an optical time domain reflectometer (OTDR) 5 connected to a second point 6 of the optical fibre cable 2. The optical component 3 comprises an optical receiver, which includes a transmitting device. The transmitting device transmits optical signals into the optical fibre cable 2 at the first point 4. The optical signals are carried along the optical fibre cable 2, to the second point 6 thereof The optical signals are carried in a direction opposite to that of traffic signals which are normally transmitted along the optical fibre cable 2 and received by the optical receiver 3. The OTDR 5 comprises a transmitter used to emit OTDR signals, and a receiver used to receive echoes of the OTDR signals. The OTDR receiver also detects the optical signals from the transmitting device of the optical receiver 3 carried along the optical fibre cable 2. At any time during which detection of an optical signal occurs, the OTDR transmitter is disabled to prevent emission of ODTR signals along the optical fibre cable 2.

The above arrangement can be used to test for a break in the optical fibre cable 2. When there is no break in the optical fibre cable 2 between the first point 4 and the second point 6, optical signals will be received by the OTDR 5 from the transmitting device of the optical receiver 3. This will prevent emission of OTDR signals, so no such signals will be applied to the optical receiver 3 and damage thereto is avoided. When there is a break in the optical fibre cable 2 between the first point 4 and the second point 6, no optical signals will be received by the OTDR 5. This will then emit OTDR signals, and echoes of the OTDR signals will be reflected back from the break, and its presence and position can be confirmed/determined. As there is a break in the optical fibre cable 2, the OTDR signals do not reach the optical receiver 3, and no damage is caused to it.

FIG. 2 shows a telecommunications network 10, comprising an optical fibre cable 20, an optical component 30 connected to a first point 40 of the optical fibre cable 20, and an optical time domain reflectometer (OTDR) 50 connected to a second point 60 of the optical fibre cable 20. The optical component 30 comprises an optical receiver, which is provided with a receive erbium doped fibre amplifier (EDFA) 70 through which the optical receiver 30 is connected to the first point 40 of the optical fibre cable 20. The EDFA 70 is controlled such that in the absence of an input signal thereto, its input isolator allows optical signals in the form of ASE noise to escape from the input of the EDFA 70. These optical signals are introduced into the optical fibre cable at the first point 40. The optical signals are carried along the optical fibre cable 20, to the second point 60 thereof. The optical signals are carried in a direction opposite to that of traffic signals which are normally transmitted along the optical fibre cable 20 and received by the optical receiver 30. The OTDR 50 comprises a transmitter used to emit OTDR signals, and a receiver used to receive echoes of the OTDR signals. The OTDR receiver also detects the optical signals from the receive EDFA 70 of the optical receiver 30 carried along the optical fibre cable 20. At any time during which detection of an optical signal occurs, the OTDR transmitter is disabled to prevent emission of ODTR signals along the optical fibre cable 20.

The above arrangement can be used to test for a break in the optical fibre cable 20. When there is no break in the optical fibre cable 20 between the first point 40 and the second point 60, optical signals will be received by the OTDR 50 from the receive EDFA 70 of the optical receiver 30. This will prevent emission of OTDR signals, so no such signals will be applied to the receive EDFA 70 and the optical receiver 30 and damage to the optical receiver is avoided. When there is a break in the optical fibre cable 20 between the first point 40 and the second point 60, no optical signals will be received by the OTDR 50. This will then emit OTDR signals, and echoes of the OTDR signals will be reflected back from the break, and its presence and position can be confirmed/determined. As there is a break in the optical fibre cable 20, the OTDR signals do not reach the receive EDFA 70 and the optical receiver 30, and no damage is caused to the optical receiver.

FIG. 3 shows a telecommunications network 100, comprising an optical fibre cable 200 and an optical component 300, with an optical time domain reflectometer (OTDR) 500 connected to a point 600 of the optical fibre cable 200. The optical component 300 comprises an optical receiver. The telecommunications network 100 further comprises a wavelength division multiplexor (WDM) 700, connected to the optical fibre cable 200 and to the optical receiver 300, as shown. Optical signals are superimposed onto the optical fibre cable 200 by multiplexing the optical signals onto the optical fibre cable using the WDM 700. The optical signals have a wavelength, e.g. 1310 nm, different to that of traffic signals which are normally transmitted along the optical fibre cable 200 to the optical receiver 300. The optical signals are carried along the optical fibre cable 200, in the opposite direction as the traffic signals, to the point 600 thereof. The OTDR 500 comprises a transmitter used to emit OTDR signals, and a receiver used to receive echoes of the OTDR signals. The OTDR receiver also detects the optical signals from the WDM 700 carried along the optical fibre cable 200. At any time during which detection of an optical signal occurs, the OTDR transmitter is disabled to prevent emission of ODTR signals along the optical fibre cable 200.

The above arrangement can be used to test for a break in the optical fibre cable 200. When there is no break in the optical fibre cable 200 between the point 600 and the WDM 700, optical signals will be received by the OTDR 500 from the WDM 700. This will prevent emission of OTDR signals, so no such signals will be applied to the optical receiver 300 and damage to this is avoided. When there is a break in the optical fibre cable 200 between the point 600 and the WDM 700, no optical signals will be received by the OTDR 500. This will then emit OTDR signals, and echoes of the OTDR signals will be reflected back from the break, and its presence and position can be confirmed/determined. As there is a break in the optical fibre cable 200, the OTDR signals do not reach the optical receiver 300, and no damage is caused to this.

The invention claimed is:

1. A method of determining whether there is a break in an optical fiber cable of a telecommunications network between a first point and a second point of the optical fiber cable, comprising the steps of:
   connecting to the first point of the optical fiber cable an optical component;
   configuring the optical component to be a receive erbium doped fiber amplifier (EDFA);
   connecting to the second point of the optical fiber cable an optical time domain reflectometer (OTDR) operative for emitting OTDR signals along the optical fiber cable towards the optical component,
   introducing at least one optical signal into the optical fiber cable at the first point thereof after a break in the optical fiber cable is suspected by arranging the receive EDFA to introduce the at least one optical signal into the optical fiber cable and by controlling isolation of an input isolator of the receive EDFA such that, in the absence of an input signal thereto. the at least one optical signal in the form of amplified spontaneous emission noise escapes from an input of the receive EDFA and is introduced into the optical fiber cable;
   using the optical fiber cable to carry the at least one optical signal to the second point thereof; and
   configuring the OTDR to detect the at least one optical signal from the optical fiber cable and to prevent emission of the OTDR signals at any time during which detection of the at least one optical signal occurs.

2. The method according to claim 1, and the step of configuring the optical component to be an optical receiver, and in which the introducing step is performed by arranging the optical receiver to introduce the at least one optical signal into the optical fiber cable.

3. The method according to claim 2, in which the arranging step is performed by configuring the optical receiver with a transmitting device, and the step of transmitting the at least one optical signal from the transmitting device into the optical fiber cable.

4. The method according to claim 1, in which the introducing step is performed by superimposing a plurality of optical signals onto the optical fiber cable.

5. The method according to claim 4, in which the superimposing step is performed by multiplexing the plurality of the optical signals onto the optical fiber cable.

6. The method according to claim 5, and the step of configuring each optical signal to be a pilot signal having a wavelength different from that of traffic signals transmitted along the optical fiber cable.

7. The method according to claim 1, in which the introducing step is performed by superimposing a plurality of optical service channel (OSC) optical signals onto the optical fiber cable.

8. The method according to claim 7, in which the superimposing step is performed by multiplexing the plurality of the OSC optical signals onto the optical fiber cable.

9. The method according to claim 1, and the step of configuring the OTDR to be a transmitter operated to emit the OTDR signals.

10. The method according to claim 9, and the step of disabling the OTDR transmitter to prevent emission of the OTDR signals at any time during which detection of the at least one optical signal occurs.

11. The method according to claim 1, and the step of configuring the OTDR to be a detector operated to detect the at least one optical signal from the optical fiber cable.

12. The method according to claim 11, and the step of configuring the OTDR detector to be able to detect the at least one optical signal in a wavelength range of approximately 1250 nm to approximately 1700 nm.

13. The method according to claim 11, and the step of configuring the OTDR detector to be used to receive echoes of the OTDR signals.

14. The method according to claim 1, and the step of configuring the OTDR to be a receiver used to receive echoes of the OTDR signals.

* * * * *